United States Patent
Liang et al.

(10) Patent No.: US 9,973,447 B2
(45) Date of Patent: May 15, 2018

(54) BUILT-IN ETHERNET SWITCH DESIGN FOR RTU REDUNDANT SYSTEM

(71) Applicant: Honeywell International Inc., Morristown, NJ (US)

(72) Inventors: Haifeng Liang, Shanghai (CN); Lei Zou, Shanghai (CN); Jie Lv, Shanghai (CN); Zhi Yang, Shanghai (CN); Ke Zou, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 307 days.

(21) Appl. No.: 14/807,767

(22) Filed: Jul. 23, 2015

(65) Prior Publication Data

US 2017/0026314 A1    Jan. 26, 2017

(51) Int. Cl.
H04L 12/931    (2013.01)
H04L 29/08    (2006.01)
H04L 12/721    (2013.01)

(52) U.S. Cl.
CPC ............ H04L 49/40 (2013.01); H04L 67/125 (2013.01); *H04L 45/66* (2013.01); *H04L 49/35* (2013.01); *H04L 49/351* (2013.01)

(58) Field of Classification Search
CPC ....... H04L 49/35; H04L 49/40; H04L 67/125; H04L 49/351; H04L 45/66
(Continued)

(56) References Cited

U.S. PATENT DOCUMENTS 5,361,256 A    11/1994 Doeringer et al.
5,394,402 A    2/1995 Ross
(Continued)

FOREIGN PATENT DOCUMENTS

CA    2433 576    7/2002
JP    10-2007-527073 A    9/2007
(Continued)

OTHER PUBLICATIONS

International Searching Authority, "Notification of Transmittal of the International Search Report and the Written Opinion of the International Searching Authority, or the Declaration," International Application No. PCT/US2016/042881, dated Oct. 19, 2016, 5 pages, publisher International Application Division Korean Intellectual Property Office, Daejeon, Republic of Korea.
(Continued)

*Primary Examiner* — Habte Mered
*Assistant Examiner* — Rownak Islam (57) ABSTRACT

A system includes a remote terminal unit (RTU) controller module. Each RTU controller module comprises a controller board configured to couple to a carrier board that includes first and second Ethernet ports. Each controller module comprises computer processing circuitry including the first and second MACs and configured to select to transmit a packet to the first Ethernet port through the first MAC and to alternatively select to transmit the packet to the second Ethernet port through the second MAC. Each controller module comprises an Ethernet switch configured to receive the packet from the first media access control (MAC) and transmit the packet to the first Ethernet port. Each controller module comprises a physical Ethernet interface (PHY) configured to receive the packet from the second MAC and transmit the packet to the second Ethernet port. The computer processing circuitry, the Ethernet switch, and the PHY are mounted on the controller board.

20 Claims, 9 Drawing Sheets

(58) Field of Classification Search
USPC .................................................. 370/328, 392
See application file for complete search history.

(56) References Cited

U.S. PATENT DOCUMENTS

| | | | |
|---|---|---|---|
| 5,617,421 A | 4/1997 | Chin et al. | |
| 5,963,540 A | 10/1999 | Bhaskaran | |
| 5,963,556 A | 10/1999 | Varghese et al. | |
| 6,195,351 B1 | 2/2001 | Hiscock et al. | |
| 6,249,883 B1 | 6/2001 | Cassidy et al. | |
| 6,308,282 B1 | 10/2001 | Huang et al. | |
| 6,356,553 B1 | 3/2002 | Nagami et al. | |
| 6,556,575 B1 | 4/2003 | Denio et al. | |
| 6,560,236 B1 | 5/2003 | Varghese et al. | |
| 7,020,796 B1* | 3/2006 | Ennis ..................... | H04L 1/22 714/4.1 |
| 7,099,336 B2 | 8/2006 | Kalkunte et al. | |
| 7,313,613 B1 | 12/2007 | Brooking et al. | |
| 8,072,098 B2 | 12/2011 | Elias et al. | |
| 8,392,626 B2 | 3/2013 | Wormmeester et al. | |
| 8,656,065 B1 | 2/2014 | Gerhart et al. | |
| 2002/0046357 A1 | 4/2002 | Huang et al. | |
| 2002/0147503 A1* | 10/2002 | Osburn, III ........ | G05B 19/4183 700/9 |
| 2002/0150107 A1* | 10/2002 | Aronson ............. | H04L 12/4625 370/395.53 |
| 2003/0165140 A1 | 9/2003 | Tang et al. | |
| 2004/0027799 A1* | 2/2004 | King ..................... | G06F 1/206 361/679.48 |
| 2004/0114610 A1* | 6/2004 | Featherston ........ | H04L 12/2898 370/401 |
| 2004/0143755 A1 | 7/2004 | Whitaker et al. | |
| 2004/0203906 A1 | 10/2004 | Kato et al. | |
| 2004/0210623 A1 | 10/2004 | Hydrie et al. | |
| 2005/0099955 A1 | 5/2005 | Mohan et al. | |
| 2005/0138432 A1 | 6/2005 | Ransom et al. | |
| 2005/0207414 A1* | 9/2005 | Duvvury ........... | H04L 29/12292 370/389 |
| 2006/0240818 A1 | 10/2006 | McCoy et al. | |
| 2007/0008968 A1 | 1/2007 | Baker et al. | |
| 2007/0078667 A1 | 4/2007 | Chand et al. | |
| 2008/0107188 A1* | 5/2008 | Kennedy .............. | H04B 1/7163 375/259 |
| 2009/0271558 A1 | 10/2009 | Wormmeester et al. | |
| 2010/0241275 A1* | 9/2010 | Crawford ........... | G05D 23/1917 700/276 |
| 2012/0063354 A1 | 3/2012 | Vanga et al. | |
| 2012/0290735 A1 | 11/2012 | Johnson et al. | |
| 2013/0149912 A1* | 6/2013 | Oberski ................. | H01R 24/64 439/676 |
| 2015/0084747 A1 | 3/2015 | McLaughlin et al. | |
| 2015/0363344 A1* | 12/2015 | Bobbitt ............... | G06F 13/4022 710/316 |

FOREIGN PATENT DOCUMENTS

| | | |
|---|---|---|
| KR | 10-2008-0108787 A | 12/2008 |
| WO | WO 00/79758 A2 | 12/2000 |
| WO | WO 03/073283 A1 | 9/2003 |
| WO | WO 2005086110 A2 | 9/2005 |

OTHER PUBLICATIONS

International Searching Authority, "Written Opinion of the International Searching Authority," International Application No. PCT/US2016/042881, dated Oct. 19, 2016, 8 pages, publisher International Application Division Korean Intellectual Property Office, Daejeon, Republic of Korea.

Moxa Inc., "Modular RTU Controller: IoPAC 8000 Series," Apr. 18, 2013, 10 pages, available at URL: http://wmv.moxa.com/doc/specs/Introduct ion_to_RTU_Controllers.pdf.

Honeywel International Inc., "RC500 Specification," RC500-010-100, Release 100, Version 1.1, Nov. 2009, 11 pages, available at https://mvw.honeywellprocess.com/library/marketing/tech-specs/RC500%20Specification%20-%20Release%20100.pdf.

Peter J. Welcher, Grand Moerschel, "Cisco PIX Firewalls: Access Lists and Management," Apr. 6, 2002, Chesapeake NETCRAFTSMEN.

Song, "Fault Recovery Port-based Fast Spanning Tree Algorithm (FRP-FAST) for the Fault-Tolerant Ethernet on the Arbitrary Switched Network Topology," Oct. 2001; ETFA (IEEE).

Song, et al., "Fault-Tolerant Ethernet Middleware for IP-Based Process Control Networks," IEEE 2000, Nov. 8, 2000, Piscataway, NJ.

International Search Report dated Oct. 25, 2006 in connection with International Application No. PCT/US2006/024670.

Written Opinion of the International Searching Authority dated Oct. 25, 2006 in connection with International Application No. PCT/US2006/024670.

International Search Report dated Jun. 10, 2015 in connection with International Application No. PCT/US2015/019671.

Written Opinion of the International Searching Authority dated Jun. 10, 2015 in connection with International Application No. PCT/US2015/019671.

\* cited by examiner

BUILT-IN ETHERNET SWITCH DESIGN FOR RTU REDUNDANT SYSTEM

TECHNICAL FIELD

This disclosure is generally directed to industrial process control and automation systems. More specifically, this disclosure is directed to a built-in Ethernet switch for remote terminal unit redundant systems.

BACKGROUND

A remote terminal unit (RTU) represents a device or system that provides localized control and data access at a site that is remote from a supervisory control and data acquisition (SCADA) system or other automation system. For example, multiple RTUs can be used at different sites and for different purposes in an oil and gas field. The RTUs can collect data, perform local control, record historical values using sensors and actuators at different sites (such as wells, pipelines, and compression stations), and provide live and historical data to an automation system. The automation system can execute control logic and alter the operations of actuators at the different sites via the RTUs. The RTUs themselves could also incorporate algorithms for data analytics.

In general, RTUs have increased in usage and complexity from their early designs in the 1970s. Today, RTUs often need to reliably support a large set of application-specific network capabilities and protocols, as well as support a number of control execution models and provide smart device integration.

SUMMARY

This disclosure provides a built-in Ethernet switch for remote terminal unit redundant systems.

In a first example, an apparatus includes a controller board configured to couple to a carrier board that includes first and second Ethernet ports. The apparatus includes computer processing circuitry including the first and second MACs and configured to select to transmit a packet to the first Ethernet port through the first MAC and to alternatively select to transmit the packet to the second Ethernet port through the second MAC. The apparatus includes an Ethernet switch configured to receive the packet from the first media access control (MAC) and transmit the packet to the first Ethernet port. The apparatus includes a physical Ethernet interface (PHY) configured to receive the packet from the second MAC and transmit the packet to the second Ethernet port. The computer processing circuitry, the Ethernet switch, and the PHY are mounted on the controller board.

In a second example a carrier board includes at least one connector configured to physically and communicably couple the carrier board to a controller board. The carrier board includes first and second Ethernet ports coupled to the at least one connector. The carrier board includes a first wiring configured to couple the at least one connector to the first Ethernet port. The carrier board includes a second wiring configured to couple the at least one connector to the second Ethernet port. The carrier board is configured to, in response to receiving an uplink packet from the controller board through the first wiring, carry the uplink packet to the first Ethernet port. The carrier board is configured to, in response to receiving an uplink packet from the controller board through the second wiring, carry the uplink packet to the second Ethernet port.

In a third example, a system includes at least one remote terminal unit (RTU) controller module. Each RTU controller module includes a controller board configured to couple to a carrier board that includes first and second Ethernet ports. Each RTU controller module includes computer processing circuitry including the first and second MACs and configured to select to transmit a packet to the first Ethernet port through the first MAC and to alternatively select to transmit the packet to the second Ethernet port through the second MAC. Each RTU controller module includes an Ethernet switch configured to receive the packet from the first media access control (MAC) and transmit the packet to the first Ethernet port. Each RTU controller module includes a physical Ethernet interface (PHY) configured to receive the packet from the second MAC and transmit the packet to the second Ethernet port. Each RTU controller module includes wherein the computer processing circuitry, the Ethernet switch, and the PHY are mounted on the controller board.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 2 through 3B illustrate details of an example RTU according to this disclosure;

DETAILED DESCRIPTION

FIGS. 1 through 8, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
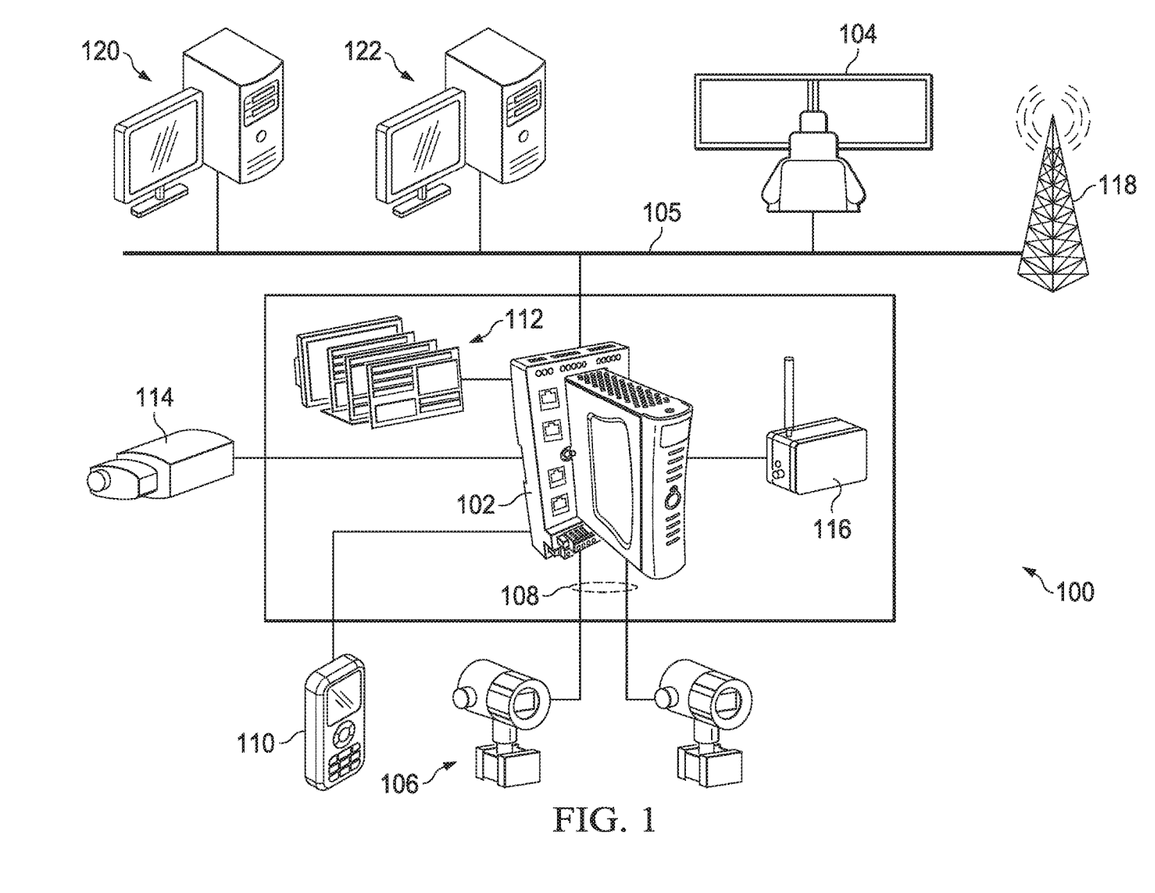
FIG. 1 illustrates an example industrial control and automation system having a remote terminal unit (RTU) according to this disclosure.

FIG. 1 illustrates an example industrial control and automation system 100 having an RTU 102 according to this disclosure. Note that the RTU 102 may also be referred to in the art as a remote telemetry unit. Also note that while a single RTU 102 is shown here, the system 100 could include any number of RTUs 102 distributed in one or more geographical areas.

The RTU 102 represents a device or system that provides localized control and data access at a site that is remote from a supervisory control and data acquisition (SCADA) system or other control system 104. For example, the RTU 102 could be positioned at or near an oil, gas, or water well or power substation. In these or other situations, the RTU 102 can be used to collect data from local sensors and process the data to generate control signals for local actuators. The RTU 102 can also interact with the control system 104 as needed. In this way, process control and automation functions can be provided at locations remote from the control system 104. The control system 104 is shown as communicating with the RTU 102 over a wired network 105 and using wireless connections, such as via microwave, cellular, or other radio frequency (RF) communications. However, the RTU 102 could communicate with the control system 104 over any suitable wired or wireless connection(s). In some embodiments, the components 102-104 could ordinarily communicate using a wired connection, with wireless communications used as backup.

The RTU 102 also communicates and interacts with one or more industrial field devices 106. The field devices 106 could include sensors that measure one or more characteristics of a process, actuators that alter one or more characteristics of a process, or other industrial field devices. In this example, the RTU 102 uses wired connections 108 to communicate with the field devices 106. The wired connections 108 could include serial connections (such as RS232 or RS485 connections), Ethernet connections, industrial protocol connections, or other wired connections. Note, however, that the RTU 102 could also communicate wirelessly with one or more field devices 106.

The RTU 102 in this example also communicates and interacts with at least one local user device 110. The user device 110 could be used by personnel to interact with the RTU 102 or with the field devices 106 or the control system 104 communicating with the RTU 102. The user device 110 includes any suitable structure supporting user interaction with an RTU.

Various other components could optionally be used with the RTU 102. For example, the RTU 102 could interact with one or more human-machine interfaces (HMIs) 112, such as display screens or operator consoles. The HMIs 112 can be used to receive data from or provide data to the RTU 102. One or more security cameras 114 (such as Internet Protocol cameras) could be used to capture still or video images and to provide the images to a remote location (such as a security center) via the RTU 102. A wireless radio 116 could be used to support wireless communications between the RTU 102 and a remote access point 118, which communicates with the control system 104 or other remote systems via the network 105. The other remote systems can include a field device manager (FDM) 120 or other asset manager and/or an RTU builder 122. The FDM 120 can be used to configure and manage assets such as field devices (including the field devices 106), and the RTU builder 122 can be used to configure and manage RTUs (including the RTU 102).

The RTU 102 has the ability to support a flexible mix of input/output (I/O) channel types. For example, the channel types can include analog inputs (AIs), analog outputs (AOs), digital inputs (DIs), digital outputs (DOs), and pulse accumulator inputs (PIs). The AIs and AOs may or may not support digital communications, such as digital communications over 4-20 mA connections compliant with the HIGHWAY ADDRESSABLE REMOTE TRANSDUCER (HART) protocol. Some RTUs 102 can achieve a desired mix of I/O channel types using I/O cards that have a fixed number of inputs and outputs, where each input or output is fixed to a particular type. Other RTUs 102 can achieve a desired mix of I/O channel types using I/O cards with reconfigurable inputs or outputs. Moreover, some RTUs 102 can be expandable so that one or more I/O modules (each with one or more I/O channels) can be used with the RTUs 102.

In particular embodiments, the RTU 102 can have one, some, or all of the following features. First, the RTU 102 can support low-power operation, such as from about 1.8 W to about 4 W, and "solar powered with battery backup" operations. Second, the RTU 102 can support operation in extended temperature ranges, such as from about −40° C. to about +75° C. Third, the RTU 102 can support expansion so that a configurable number of I/O channels can be used with the RTU 102. Fourth, the RTU 102 can support a variety of control execution methods, such as function block, ladder logic, user-structured text and programming, and sequence operations. Fourth, the RTU 102 can support two-, three-, or four-wire analog inputs and outputs for both field- and device-powered transmitters and smart valve positioners. Fifth, the RTU 102 can support other I/O types without restriction in terms of mix, including AI, AI with digital communication, AO, AO with digital communication, DI (including digital input sequence of event or "DI-SOE" inputs), DO, and PI. Sixth, the RTU 102 can support RTU control module redundancy. Seventh, the RTU 102 can support RTU pricing, which is lower than conventional distributed control system (DCS) devices.

Although FIG. 1 illustrates one example of an industrial control and automation system 100 having an RTU 102, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while shown as being used with wired field devices, the RTU 102 could be used with only wireless field devices or with both wired and wireless field devices. In addition, FIG. 1 illustrates one example operational environment where an RTU 102 can be used. One or more RTUs could be used in any other suitable system.

Figure 2:
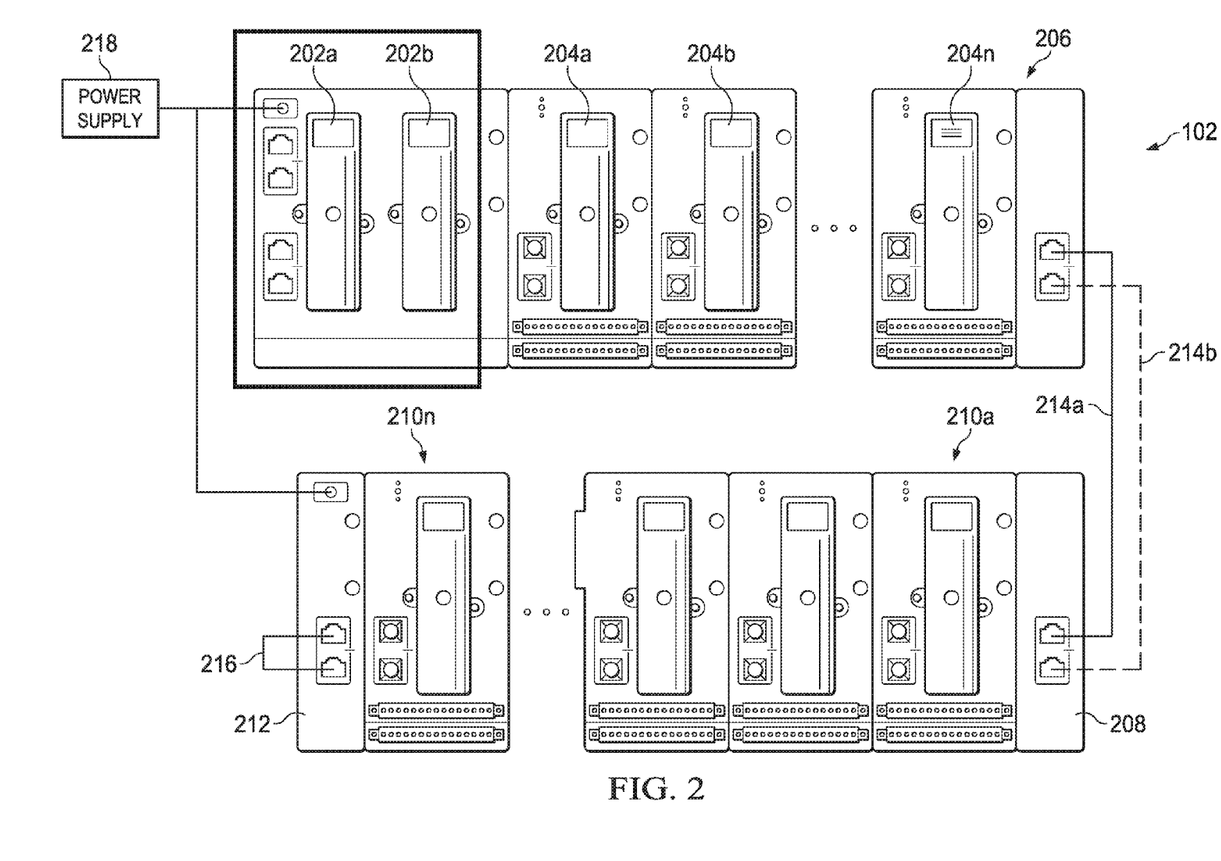
Figure 3A:
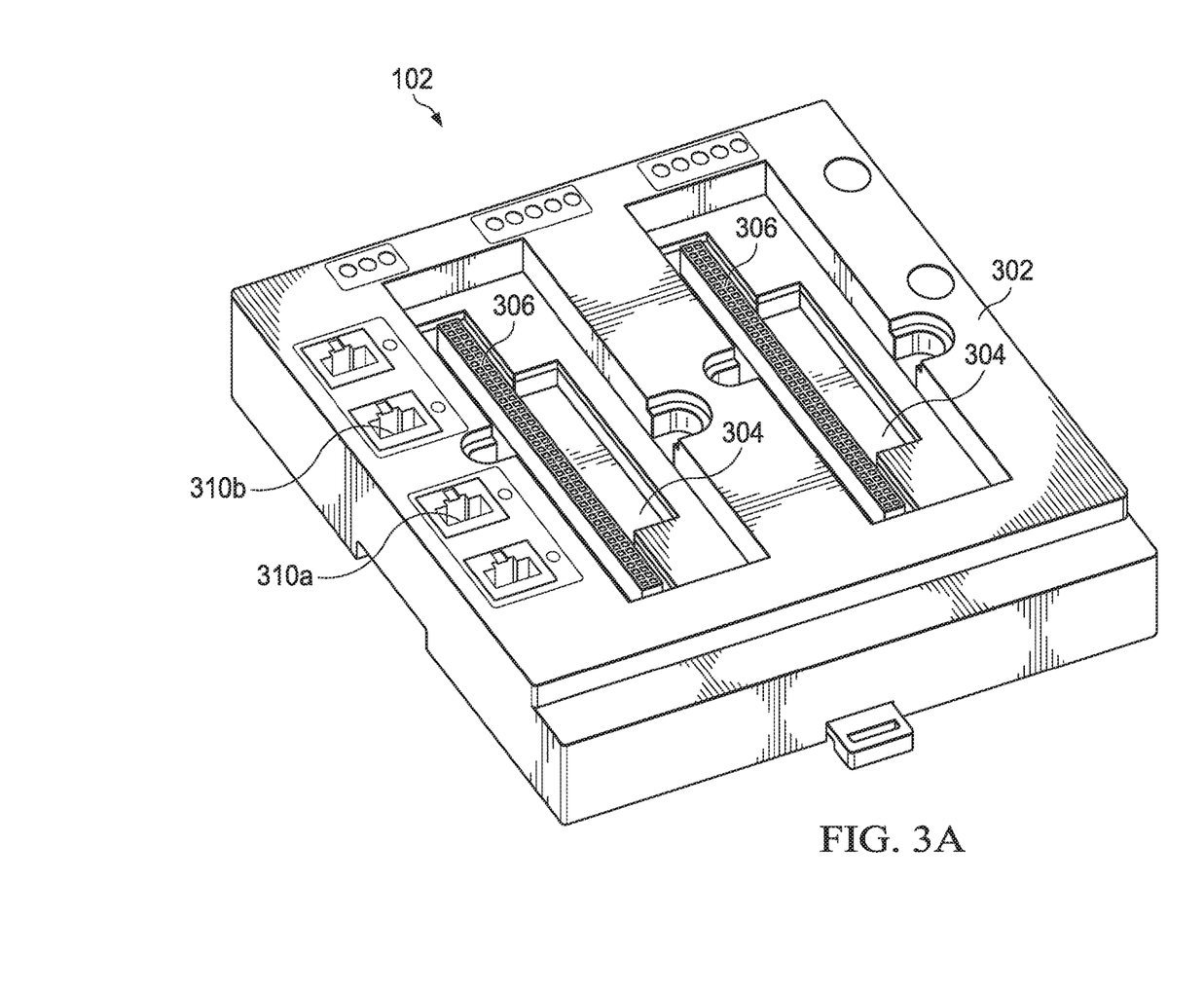
Figure 3B:
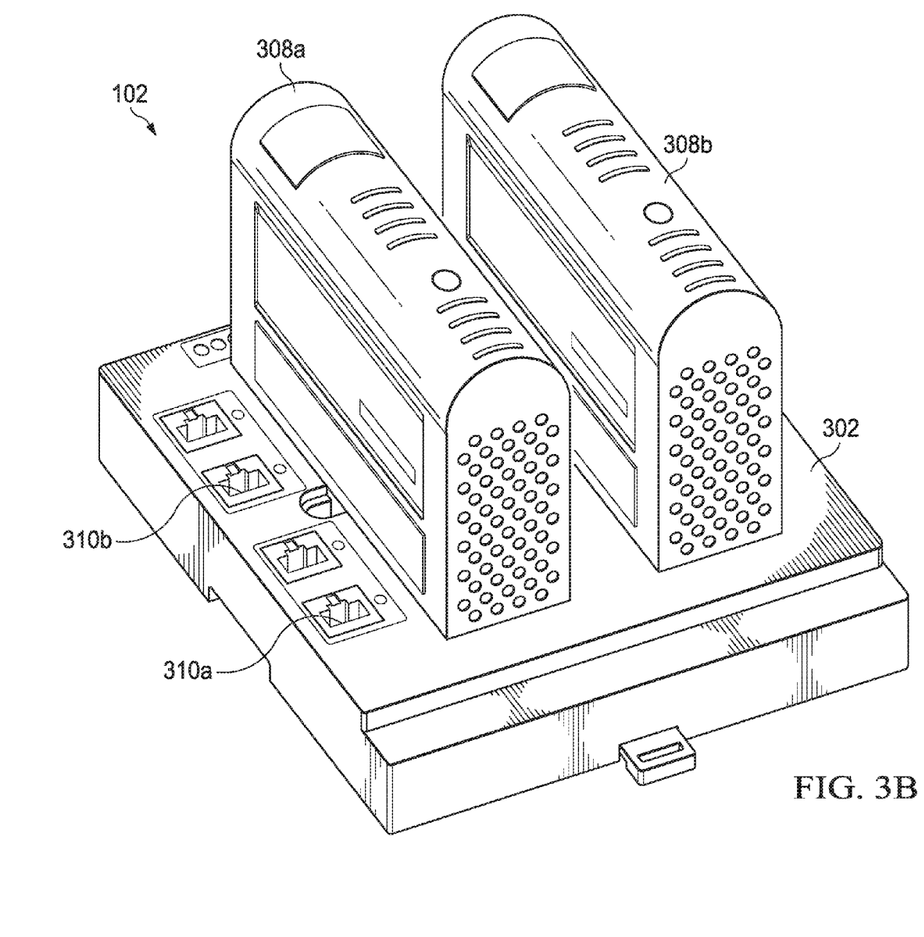

FIGS. 2 through 3B illustrate details of an example RTU 102 according to this disclosure. For ease of explanation, the RTU 102 is described as being used in the system 100 of FIG. 1. However, the RTU 102 could be used in any other suitable system.

FIG. 2 illustrates an example of the RTU 102 with redundant controller modules 202a-202b, a first set of I/O modules 204a-204n, and an expansion board 206. Each controller module 202a-202b represents a module that executes control logic and other functions of the RTU 102. For example, each controller module 202a-202b could execute control logic that analyzes sensor data and generates control signals for actuators. Each controller module 202a-202b could also execute functions that control the overall operation of the RTU 102, such as functions supporting communications with external devices or systems. Each controller module 202a-202b includes any suitable structure for controlling one or more operations of an RTU. In some embodiments, each controller module 202a-202b includes at least one processing device that executes a LINUX or other operating system.

The I/O modules 204a-204n support communications between the controller modules 202a-202b and external devices or systems (such as the field devices 106) via I/O channels of the I/O modules 204a-204n. Each I/O module 204a-204n includes circuitry supporting the use of one or more I/O channels. If an I/O module supports the use of one or more reconfigurable I/O channels, the I/O module 204a-204n also includes circuitry that configures at least one I/O channel as needed. The circuitry can be used to configure and reconfigure each I/O channel as desired. For instance, example types of reconfigurable I/O channels are shown in U.S. Pat. No. 8,072,098; U.S. Pat. No. 8,392,626; and U.S. Pat. No. 8,656,065 (all of which are hereby incorporated by reference in their entirety). Also, the use of reconfigurable I/O channels in an RTU is described in U.S. patent application Ser. No. 14/228,142 (which is hereby incorporated by reference in its entirety). The RTU 102 can include any number of I/O modules 204a-204n. In some embodiments, a specified number of I/O modules 204a-204n (such as eight modules) can be built into the RTU 102.

The expansion board 206 allows the RTU 102 to be coupled to an expansion board 208, which is coupled to a second set of I/O modules 210a-210n. The I/O modules 210a-210n could have the same or similar structure as the I/O modules 204a-204n, and any number of I/O modules 210a-210n could be used in the second set (such as eight modules). An expansion board 212 can be used to couple to a third set of I/O modules. Additional I/O modules can be added in a similar manner.

Each expansion board 206, 208, 212 includes any suitable structure facilitating the addition of one or more I/O modules to an RTU. In this example, two electrical paths 214a-214b are formed through the RTU 102, and the electrical paths 214a-214b meet at a loop 216. The electrical paths 214a-214b could be formed in any suitable manner, such as by using Ethernet connections and electrical paths through the I/O modules and expansion boards. The loop 216 can be used to indicate that no additional I/O modules are presently connected to the RTU 102. Note, however, that the loop 216 could also be placed on the expansion board 206 to indicate that no additional sets of I/O modules are currently connected to the RTU 102.

A power supply (PS) 218 provides operating power to the components of the RTU 102. The power supply 218 includes any suitable structure(s) configured to provide operating power to an RTU. For example, the power supply 218 could include one or more batteries, solar panels, fuel cells, or other source(s) of power.

In some embodiments, the controller modules 202a-202b are implemented using separate circuit boards. Communications between the redundant controller modules 202a-202b could occur via various communication interfaces of the circuit boards. If the redundant controller modules 202a-202b are present in the RTU 102 (which need not always be the case), the RTU 102 can automatically manage which redundant controller module has control of each I/O module and provide seamless switchover upon a failure of a controller module.

FIGS. 3A and 3B illustrate additional details regarding the example RTU 102. FIG. 3A shows that a backplane 302 of the RTU 102 includes two controller mounting slots 304, where each mounting slot 304 includes a connector 306 configured to be connected to a board-to-board connector of a controller module 202a-202b. In FIG. 3B, the redundant controller modules 202a-202b are plugged into the backplane 302 of the RTU 102 via their board-to-board connectors, and housing members 308a-308b are used to cover and protect the controller modules 202a-202b. The housing members 308a-308b can have any suitable size, shape, and dimensions and be formed from any suitable material(s) (such as metal or ruggedized plastic). Similar material(s) could be used to cover the backplane 302.

The RTU 102 also includes various ports 310a-310b that facilitate communications with other devices and systems. For example, the ports 310a could denote uplink/downlink ports, and the ports 310b could denote RS232 ports. Other or additional ports (such as two RS485 ports) could be used with the RTU 102. The ports 310a can be used to couple the RTU 102 to higher-level or lower-level devices, such as the control system 104, FDM 120, or RTU builder 122 via the network 105. The ports 310a could represent any suitable structures for coupling to one or more communication links, such as Ethernet ports. The ports 310b and the RS485 ports could be used to couple the RTU 102 to one or more field devices or other devices that use the RS232 or RS485 serial protocol.

Figure 4:
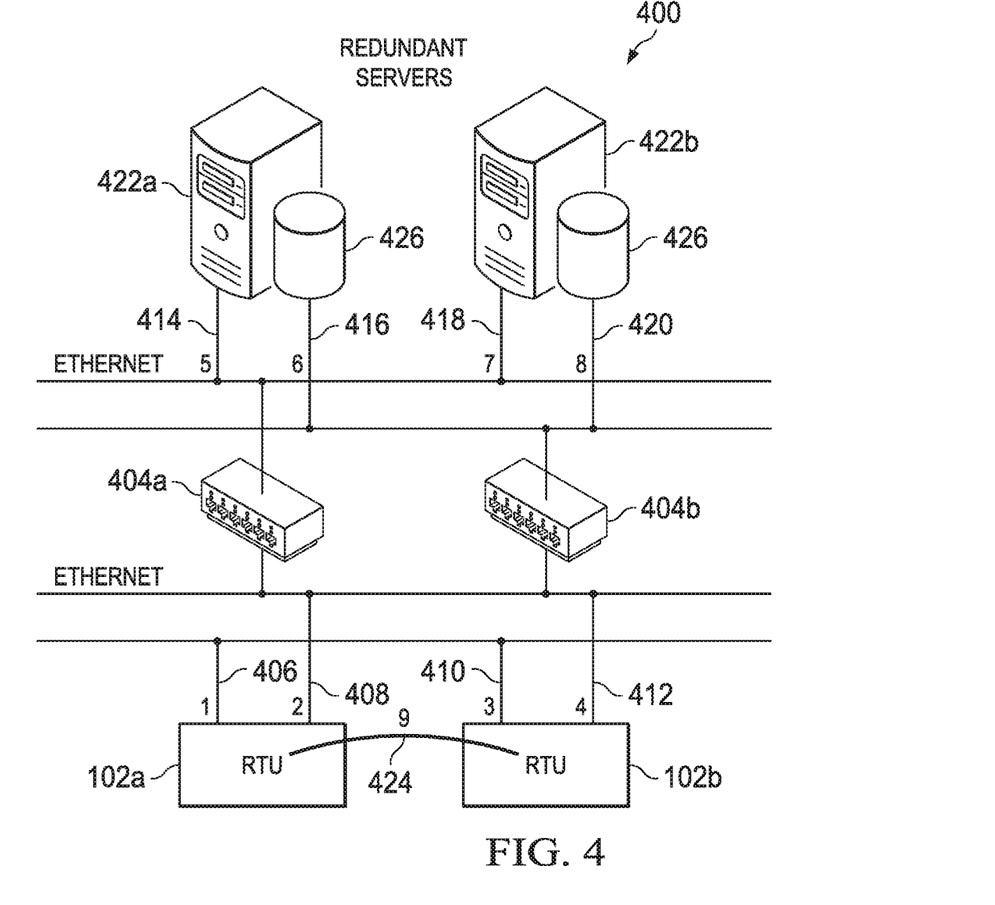
FIG. 4 illustrates a redundant RTU system according to this disclosure.

FIG. 4 illustrates a redundant RTU system 400 according to this disclosure. The redundant RTU system 400 leverages two independent switches to achieve redundant communication with a workstation. The redundant RTU system 400 includes redundant RTUs 102a-102b, redundant servers 422a-422b (each generally referred to by reference number 422, such as the RTU builder 122 of FIG. 1), and redundant switches 404a-404b (each generally referred to by reference number 404) connected intermediately between the RTU pairs and server pairs. That is, the independent switches 404a-404b are external to each other as well as external to the RTU pairs 102a-102b and server pairs 422a-b. In certain embodiments, the redundant RTUs refer to a single RTU 102 that includes redundant controller modules 202a-202b. In certain embodiments, the switch 404 is a 2-port switch wherein one port is connected to an Ethernet bus that is connected to the redundant servers 422a-422b and the other Ethernet port is connected to a bus that is connected to the redundant RTUs 102a-102b. In certain embodiments, the server 422 includes a database 426. A server 422 can be revered to as an Ethernet node.

An Ethernet switch 404 usually consumes several watts or even more, depending on how many ports the switch can support. Typical power consumption for a 5-port switch would be approximately 2 watts. Accordingly, a total of at least 4 watts is required for redundant communication using 5-port switches. It is a challenge for solar powered or battery powered applications to provide 4 watts of continuous power.

Additionally, the spatial footprint—meaning amount of space occupied—for the switch 404 is a concern as well for RTU application because the RTU 102 and Ethernet I/O usually are enclosed inside a cabinet. For the system 400, the cabinet in which the pair of RTUs 102a-102b is disposed needs to be large enough to reserve enough room to enclose the pair of switches 404a-404b.

As a third challenge, the wiring is very complex in the system 400. That is, each RTU achieves redundant communication with redundant servers 422a and 422b, respectively, through two communication paths that connect each RTU to each switch, and two communication paths that connect each switch to each server as well. Specifically, the RTU 102a connects to the switch 404a through a first cable wiring 406 and connects to the switch 404b through a second cable wiring 408; and the RTU 102b connects to the switch 404a through a third cable wiring 410 and connects to the switch 404b through a fourth cable wiring 412. The server 422a connects to the switch 404a through a fifth cable wiring 414 and connects to the switch 404b through a sixth cable wiring 416; and the server 422b connects to the switch 404a through a seventh cable wiring 418 and connects to the switch 404b through an eighth cable wiring 420. As shown in FIG. 4, there are a total of eight cable wirings required for this redundant communication architecture, and a ninth cable wiring 424 connects the RTU 102a to the RTU 102b as a private path for redundancy synchronization. It is a challenge to achieve accuracy in a complex wiring design in light of the potential for human error.

As a further challenge, each industrial Ethernet switch 404 in the system 400 is expensive. That is, the total cost of equipment for this system 400 can be high.

Figure 5:
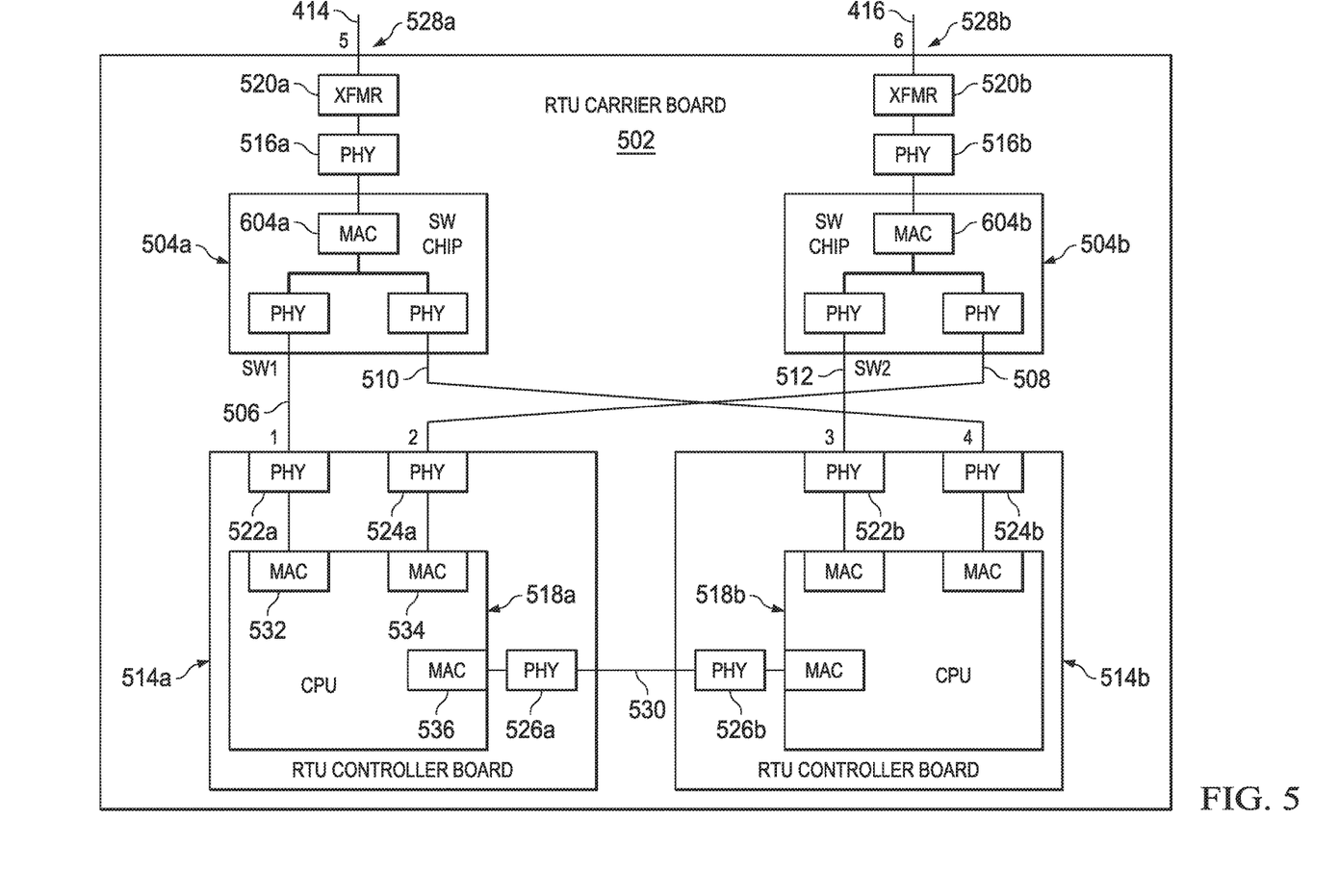
FIG. 5 illustrates two Ethernet switch chips on a redundant RTU carrier board according to this disclosure.

FIG. 5 illustrates two Ethernet switch chips on a redundant RTU carrier board according to this disclosure. In the redundant communication architecture shown in FIG. 5, a backplane, such as the backplane 302, includes an RTU carrier board 502. The RTU carrier board 502 includes redundant 3-port Ethernet switch chips 504a-504b (SW1 and SW2) (generally referred to by reference number 504). To replace the in-field manual labor associated with connecting the cable wiring 424, the RTU carrier board 502 includes an on-board wiring 530 that connects the CPU 518a to the CPU 518b as a private path for redundancy synchronization. To replace the in-field manual labor associated with connecting the cable wirings 406, 408, 410, and 412, the RTU carrier board 502 includes respective on-board wirings 506, 508, 510, and 512 that connect the switch chips 504a-504b to controller to carrier connectors (not shown), such as connector 306 of FIG. 3. The controller to carrier connector is configured to physically and communicably couple (for example, connect) an RTU controller board 514 to the RTU carrier board 502. The RTU carrier board 502 includes redundant physical Ethernet interface (PHY) chips 516a-516b (generally referred to by reference number 516), and redundant transformers 520a-520b.

The 3-port Ethernet switch chip 504 replaces the standalone switch 404, thereby removing the problems of high power consumption and expensiveness associated with the external switch 404. For example, the switch chip 504 can be a three port managed Ethernet switch, such as the model KSZ8873 chip from the MICROTEL company, which consumes less power than a standalone switch 404. Also, the spatial footprint of the switch chip 504 is less than the spatial footprint of the external switch 404. By removing the stand alone switch 404 and including switch chips 504 on the RTU carrier board 502, the spatial footprint of the cabinet in which the RTUs are disposed can be smaller because there is no need to reserve space for an external or standalone switch 404.

The switch chip 504 can be configured for either PHY-mode or MAC-mode. PHY-mode is used to connect the switch interface to an external media access control (MAC). MAC mode is used to connect switch interface to an external PHY. In the example shown, the switches 504a-504b are configured for MAC-mode, and the two PHY chips 516a-516b (external to the switches 504) are required for each switch chip to support Ethernet communication. As another example, when a switch 504 is configured in PHY-mode, the PHY chip 516 is replaced by a MAC chip.

The same redundant RTUs 102a-102b from FIGS. 3 and 4 can be connected to the RTU redundant carrier board 502. That is, the RTUs 102a-102b can include the same kind of RTU controller board 514 (individually referred to by reference numbers 514a and 514b). The RTU controller board 514 is inserted into a mounting slot 304 and connected to the RTU redundant carrier board 502 to achieve redundant communication paths through two Ethernet ports 528a-528b. Cable wirings can be inserted into or otherwise communicably coupled to the Ethernet ports 528a-528b. For example, the redundant communication paths can include the fifth and sixth cable wiring 414 and 416 between the server 422a and two redundant switches, namely the switch chips 504a-504b.

Each RTU controller board 514 includes a CPU 518, and PHYs 522, 524, and 526. The CPU 518 includes at least one processing unit, which could, for instance, include at least one processor, microprocessor, microcontroller, field programmable gate array (FPGA), application specific integrated circuit (ASIC), or other processing or control device. The CPU 518 includes executable instructions stored in a machine-usable, computer-usable, or computer-readable medium in any of a variety of forms, wherein the instructions, when executed, cause processing circuitry to perform operations for a remote terminal unit having a built-in Ethernet switch in a redundant system. The CPU 518 selects, from multiple communication paths, a communication path for packet transmission, and can make the selection based on conditions of the multiple communication paths. For example, the CPU 518 can select to communicate to a server 422 through the MAC 532 or the MAC 534. Also, the CPU 518 can select to communicate to another RTU through the MAC 536.

The RTU redundant carrier board 502 provides redundant communication in case of any single point failure. For example, when the RTU controller board 514a is in active mode, there are two possible paths, namely, a first Ethernet port 528a through switch 504a and a second Ethernet port 528b through switch 504b. Although the RTU redundant carrier board 502 significantly reduces power consumption, footprint, and cost, each RTU controller board 514 requires three Ethernet PHYs and one Ethernet switch circuit. That is, in order for processing circuitry to select one of the redundant paths between the RTU controller board 514 and an Ethernet port 528, two Ethernet PHYs 522 and 524 (individually referred to by reference numbers 522a-522b and 524a-524b) directly connected with the central processing unit 518 (CPU) of the RTU controller board 514 and one PHY 516 connected with the switch MAC 604 (described more particularly below with reference to FIG. 6, and individually referred to by reference numbers 604a-604b) are required. More particularly, one communication path of the RTU controller board 514a includes the PHY 522a, wiring 506, switch 504a, and port 528a; the other communication path of the RTU controller board 514a includes the PHY 524a, wiring 508, switch 504b, and port 528b. A similar pair of redundant communication paths applies to the RTU controller board 514b. The RTU controller board 514 includes an additional PHY 526 (individually referred to by reference numbers 526a-526b) for the private path for redundancy synchronization.

Given that the switch 504 and PHY chip 516 are active components on the RTU redundant carrier board 502, if the RTU carrier board is broken down or faulted, then neither of the switches 504a-504b and neither of the two related PHYs 524-524b will work. As a result, the Ethernet communication from the RTU controller board 514 through any cable wiring 414 or 416 may be lost. However, when only passive components are allowed to be placed on the carrier board 502, then the carrier board 502 can be considered to have permanent reliability and stability.

Figure 6:
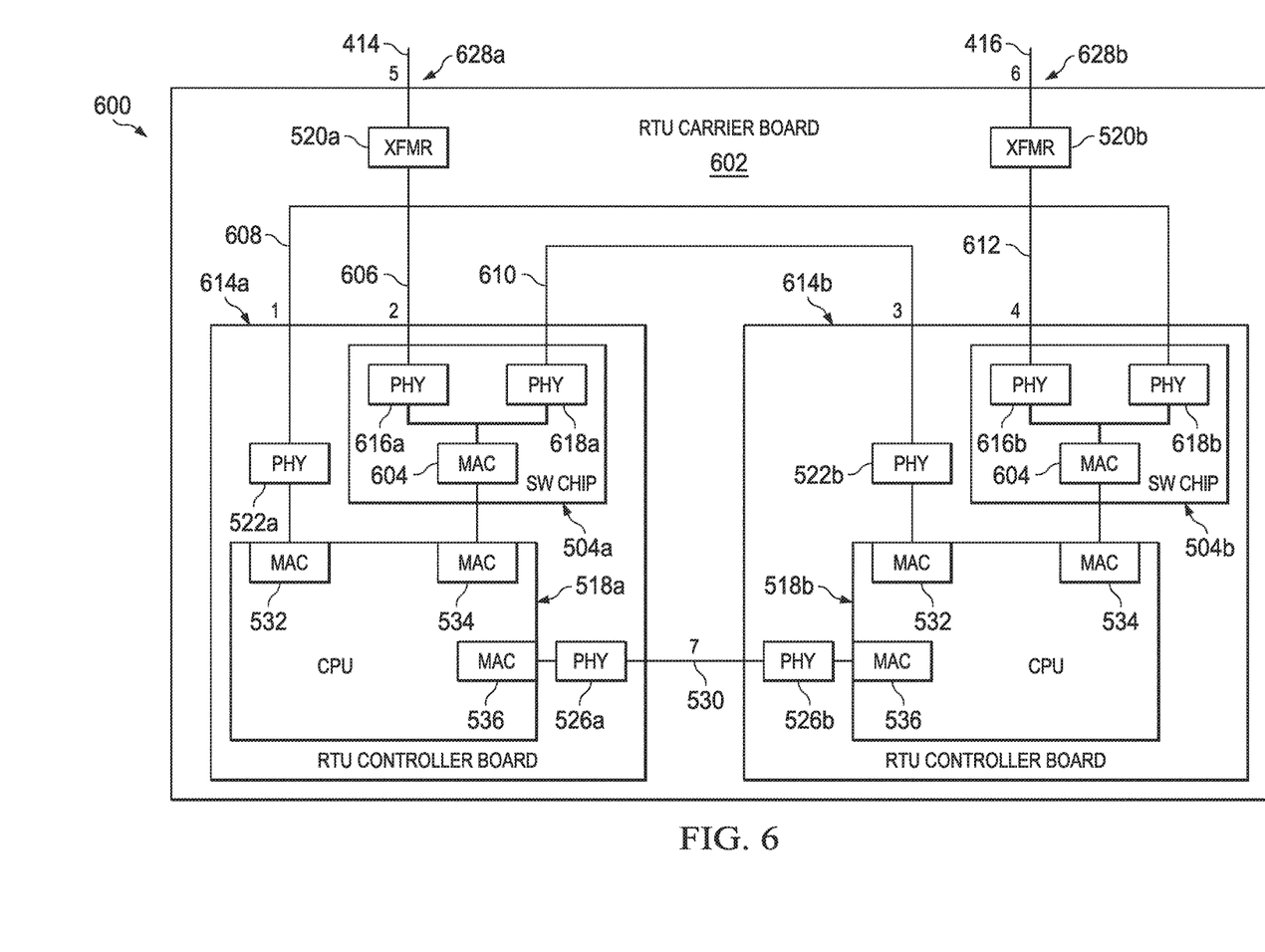
FIG. 6 illustrates a redundant communication architecture according to this disclosure.

FIG. 6 illustrates a redundant communication architecture 600 according to this disclosure. Although certain details will be provided with reference to the components of the redundant communication architecture 600, it should be understood that other embodiments may include more, less, or different components. Note that components 504a-504b, 518a-518b, 520a-520b, 522a-522b, 526a-526b, and 530 in the redundant communication architecture of FIG. 5 could be used in the redundant communication architecture 600 in FIG. 6. These components in FIG. 6 can operate in the same or similar manner as the corresponding components in FIG. 5.

The RTU carrier board 602 includes redundant transformers 520a-520b and controller to carrier connectors (not shown), such as connector 306 of FIG. 3. The controller to carrier connector is configured to physically and communicably couple (for example, connect) an RTU controller board 614 to the RTU carrier board 602. As shown, the RTUs (for example, RTUs 102a-102b) that include the RTU controller board 614a-614b are connected to the RTU redundant carrier board 602. That is, the RTUs 102a-102b can include the same kind of RTU controller board 614. The RTU controller board 614 is inserted into a mounting slot 304 and connected to the RTU redundant carrier board 602 to achieve redundant communication paths through two Ethernet ports 628a-628b. To replace the in-field manual labor associated with connecting the cable wirings 406, 408, 410, and 412, the RTU carrier board 602 includes respective on-board wirings 606, 608, 610, and 612 that connect the switch chips 504a-504b to controller to carrier connectors (not shown), such as connectors 306 of FIG. 3. The wiring 606, 608, 610, 612 and 530 are all printed circuit board (PCB) routing, instead of cables. However, the wirings 414 and 416 are Ethernet uplink communication cables. As a result, the system 600 wiring is simplified compared to the wiring of FIGS. 4 and 5.

Each RTU controller board 614 includes a switch chip 504, a PHY 522, a CPU 518, and a PHY 526. The switch chip 504 includes a MAC 604 that is connected to the CPU 518 through the MAC 534. The PHY 522 is connected to the CPU 518 through the MAC 532. The PHY 526 is connected to the CPU 518 through the MAC 536.

In the redundant communication architecture 600, there is no active component on the carrier board, which is a technical advantage to add reliability to operations of the RTU controller boards. Specifically, the switch chip 504a has moved off the carrier board 502 and into the RTU controller board 614 (individually referred to by reference numbers 614a and 614b) and has replaced one PHY chip 524 on RTU controller board.

In the redundant communication architecture 600, in order for processing circuitry to select one of the redundant paths between the RTU controller board 614 and an Ethernet port 528, each RTU requires a single PHY chip 522 and a single switch chip 504. By comparison, the redundant communication architecture 600 includes four fewer PHY chips than the redundant communication architecture shown in FIG. 5. More particularly, the RTU carrier board 602 does not include the PHYs 516a-516b connected between a switch chip 504 and a transformer 520, and the RTU controller board 614 does not include the PHYs 524a-524b connected between a CPU 518 and a switch chip 504. By reducing the number of components used for redundant communication, the redundant communication architecture 600 provides the technical advantage of reducing manufacturing costs, reducing spatial footprint, and reducing power consumption.

With the built-in Ethernet switch 504 on the RTU controller board 614, the ports of the external standalone switch can be reduced. In some situations, the external switch can be totally removed from the system. In situations wherein redundancy is not needed, a single RTU 102a can connect to a non-redundant carrier board for a non-redundant RTU implementation (shown in FIG. 8), and later, when redundancy is needed, the RTU 102a (and the RTU 102b) can connect to the redundant carrier 602 for a redundant RTU implementation (shown in FIG. 7). Accordingly, different Ethernet ports can be exposed by using differently designed RTU carrier boards without changing the RTU controller hardware design for non-redundant and redundant cases.

In the redundant RTU implementation, the redundant RTU carrier board 602 is configured such that one port 616 (individually referred to by reference numbers 616a-616b) of each 3-port switch 504 is exposed, and the PHY port 522 connects to the other port 618 (individually referred to by reference numbers 618a-618b) of another 3-port switch. Specifically, the PCB wiring 606 connects the PHY port 616a of the switch chip 504a to the Ethernet network (e.g., the cable wiring 414 and server 422), exposing the port 616a to the Ethernet network. In a similar manner, the PCB wiring 612 connects and exposes the PHY 616b to the Ethernet network (e.g., the cable wiring 416). When the CPU 518 selects to transmit packets through its MAC 534, these exposed wirings 606, 612 provide a communication path to the local Ethernet port 628 through a local switch 504, such as through the MAC 604 and exposed PHY port 616. That is, the switch chip 504a and Ethernet port 628a correspond as local to the CPU 518a, and switch chip 504b and Ethernet port 628b correspond as local to the CPU 518b.

Alternatively, the CPU 518 can select to transmit packets through the MAC 532. The PCB wiring 608 connects the PHY port 522a of the RTU controller board 614a to the PHY port 618b of the other switch chip 504b. In a similar manner, the PCB wiring 610 connects the PHY port 522b of the RTU controller board 614b to the PHY port 618a of the other switch chip 504a. Accordingly, when the CPU 518 selects to transmit packets through its MAC 532, these non-exposed wirings 608, 610 provide a communication path to the redundant Ethernet port not only through both the PHY 522 and a redundant switch 504, but also through the exposed wirings 606, 612 of the redundant switch 504. The switch chip 504a and Ethernet port 628a correspond as redundant to the CPU 518b, and switch chip 504b and Ethernet port 628b correspond as redundant to the CPU 518a. As a specific example, when the CPU 518a selects to transmit a packet through its MAC 532, the packet follows a communication path to the PHY 522a, through the non-exposed PCB wiring 608, to the non-exposed PHY port 618b of the redundant switch 504b, and to the exposed PHY port 616b of the redundant switch 504b, where the exposed wiring 612 leads to the Ethernet port 628b. The transmissions from the CPU 518b can follow an analogous communication path.

Figure 7:
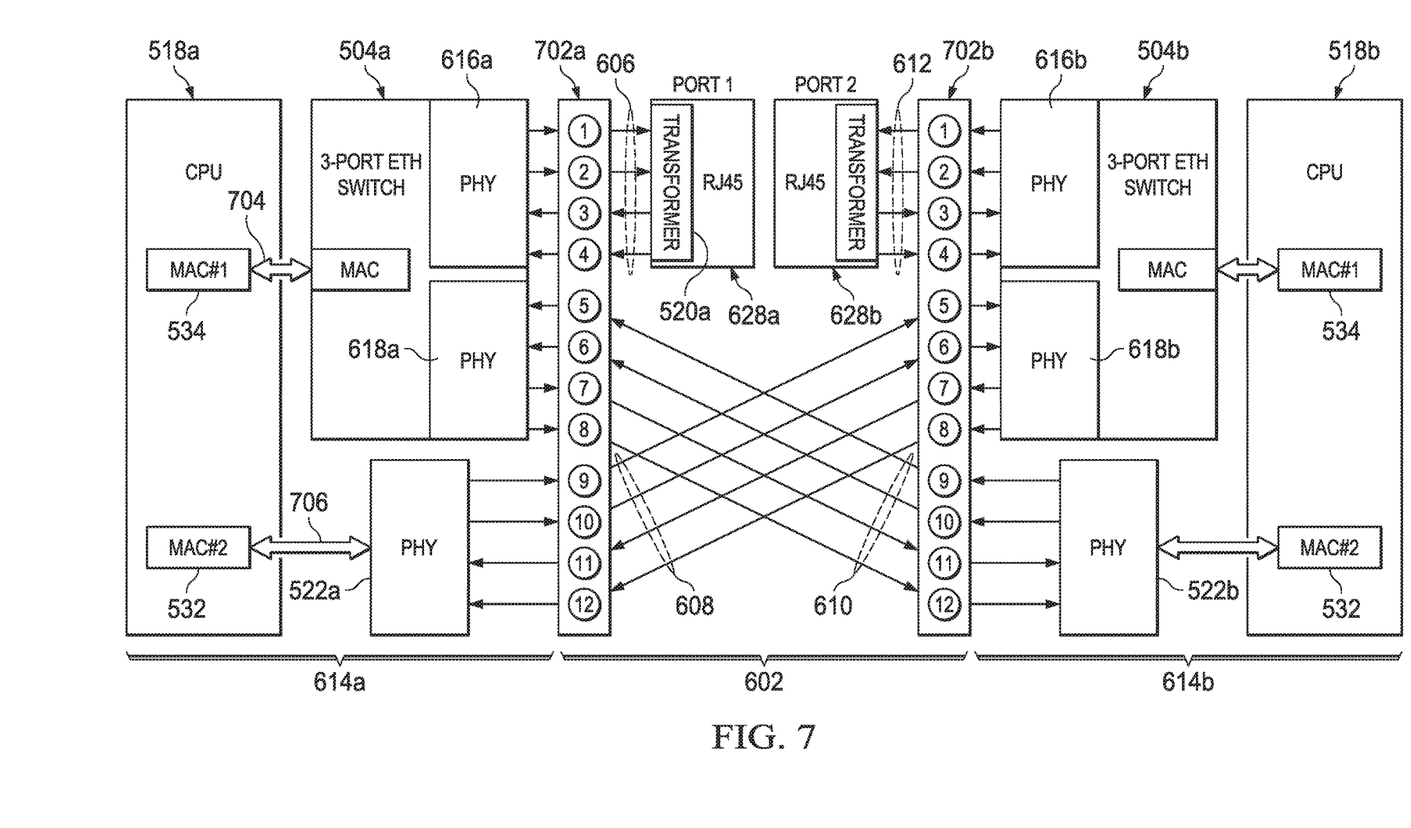
FIG. 7 illustrates additional details of the redundant RTU hardware architecture of FIG. 6.

FIG. 7 illustrates additional details of the redundant RTU hardware architecture 600 of FIG. 6, which includes the redundant RTU carrier board 602. Certain features hidden in FIG. 6 are visible in FIG. 7. For example, the redundant RTU carrier board 602 includes two controller to carrier connectors 702a and 702b. The controller to carrier connectors 702a and 702b in FIG. 7 can operate in the same or similar manner as the corresponding component 306 in FIG. 3.

In the RTU carrier board 602, the PCB wiring 606 includes two uplink channels from ports (or terminals) 1 and 2 of the connector 702a to the transformer 520a associated with the Ethernet port 628a (Port 1). The PCB wiring 606 includes two downlink channels from the transformer 520a to ports 3 and 4 of the connector 702a. Similarly, the PCB wiring 612 includes two uplink channels from ports 1 and 2 of the connector 702b to the transformer 520b associated with the Ethernet port 628b (Port 2). The PCB wiring 612 includes two downlink channels from the transformer 520b to ports 3 and 4 of the connector 702b. Also in the RTU carrier board 602, the PCB wiring 610 includes two receiving channels to the ports 5 and 6 of the local connector 702a from ports 9 and 10 of the redundant connector 702b. The PCB wring 610 includes two transmitting channels from ports 7 and 8 of the local connector 702a to the ports 11 and 12 of the redundant connector 702b. Similarly, the PCP wiring 608 includes two transmitting channels from ports 9 and 8 of the local connector 702a to the ports 5 and 6 of the redundant connector 702b. The PCB wring 610 includes two receiving channels to the ports 11 and 12 of the local connector 702a from ports 7 and 8 of the redundant connector 702b.

Correspondingly, the RTU controller board 614a is configured to connect to the connector 702a and provide: two uplink channels from the PHY 616a to ports 1 and 2 of the connector 702a; two downlink channels to the PHY 616a from ports 3 and 4; two receiving channels to the PHY 618a from the ports 5 and 6; two transmitting channels from the PHY 618a to ports 7 and 8; and two receiving channels to the PHY 522 from ports 11 and 12.

The operations of the RTU controller board 614a are described in reference to FIG. 7, and it is to be understood that an analogous configuration applies to the RTU controller board 614b. In the RTU controller board 614a, the MAC 534 (MAC #1) is connected to the MAC 604 of its local 3-port Ethernet switch 504a through a PCB wiring 704, and the MAC 534 (MAC #2) is connected to the PHY port 522a through a PCB wiring 706.

Figure 8:
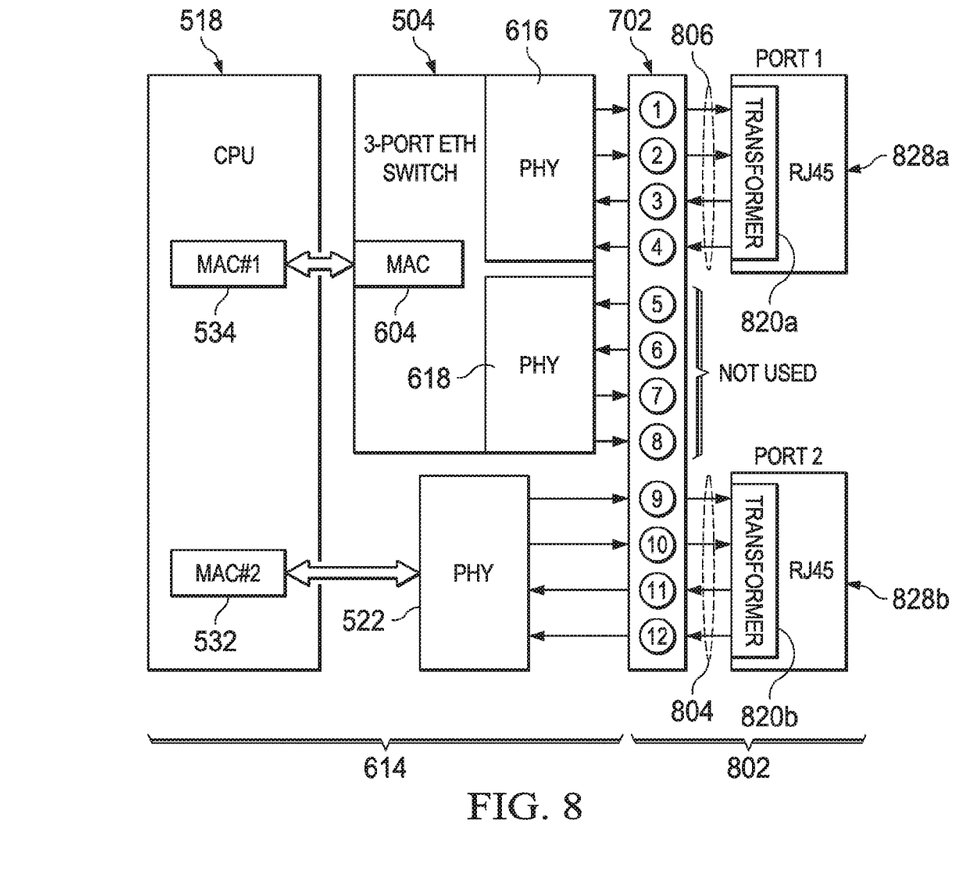
FIG. 8 illustrates a non-redundant RTU hardware architecture including a non-redundant RTU carrier board according to this disclosure.

FIG. 8 illustrates a non-redundant RTU hardware architecture including a non-redundant RTU carrier board 802 according to this disclosure. For non-redundant RTU implementation, the Ethernet PHY port 522 and one PHY port 616 of 3-port switch 504 are exposed to two Ethernet ports 828a and 828b (Port1 and Port 2) into which cable wirings 414 and 416 plug.

The non-redundant RTU carrier board 802 includes two PCB wirings 804 and 806, both similar to the wiring 606 of FIG. 7. The PCB wiring 806 includes two uplink channels from ports 1 and 2 of the connector 702 to the transformer 820a associated with the Ethernet port 828a (Port 1). The PCB wiring 806 includes two downlink channels from the transformer 820a to ports 3 and 4 of the connector 702. Similarly, the PCB wiring 804 includes two uplink channels from ports 9 and 10 of the connector 702 to the transformer 820b associated with the Ethernet port 828b (Port 2).

Although RTU controller board 614 is configured to connect the PHY 618 to ports 5-8 of the connector 702, the RTU carrier board 802 does not use for redundancy operations. In certain embodiments, non-redundant RTU carrier board 802 does not include any connections and does not use ports 5-8 of the connector 702.

When the CPU 518 selects to transmit packets through its MAC 534, the exposed wiring 806 provides a communication path to the Ethernet port 828a through its local switch 504, such as through the MAC 604 and exposed PHY port 616. When the CPU 518 selects to transmit packets through its MAC 532, the exposed PCB wiring 804 connects the PHY port 522 of the RTU controller board 614 to the Ethernet port 828b.

Although FIGS. 1 through 8 illustrate examples of an industrial control and automation system having an RTU with a built-in Ethernet switch and related details, various changes may be made to FIGS. 1 through 8. For example, the functional divisions shown in FIGS. 1 through 8 are for illustration only. Various components in FIGS. 1 through 8 could be combined, further subdivided, or omitted and additional components could be added according to particular needs.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. An apparatus comprising:
a controller board configured to couple to a carrier board that includes first and second Ethernet ports;
computer processing circuitry including first and second media access controls (MAC) and configured to select to transmit a packet to the first Ethernet port through the first MAC and to alternatively select to transmit the packet to the second Ethernet port through the second MAC;
an Ethernet switch configured to receive the packet from the first MAC and transmit the packet to the first Ethernet port, the Ethernet switch comprising:
a first switch port that includes a third MAC coupled to the first MAC;

a second switch port that includes an exposed physical Ethernet interface (PHY) configured to couple the Ethernet switch to the first Ethernet port; and a third switch port that includes a non-exposed PHY configured to couple the first Ethernet port to a PHY of a second controller board; and a third PHY configured to receive the packet from the second MAC and transmit the packet to the second Ethernet port, wherein the computer processing circuitry, the Ethernet switch, and the third PHY are mounted on the controller board.

2. The apparatus of claim 1, wherein the controller board is further configured to physically and communicably couple to the carrier board through a connector.

3. The apparatus of claim 2, wherein:
the exposed PHY is configured to couple the Ethernet switch to the first Ethernet port through the connector; and
the non-exposed PHY is configured to couple the first Ethernet port to the PHY of the second controller board through the connector.

4. The apparatus of claim 3, wherein the Ethernet switch is configured to:
receive, at the second switch port, a second packet from the first Ethernet port through downlink channel terminals of the connector, and
select to transmit the second packet to the computer processing circuitry through the first MAC, and
alternatively select to transmit the second packet to the third switch port in order to transmit the second packet to the PHY of the second controller board.

5. The apparatus of claim 3, wherein the Ethernet switch is configured to:
in response to receiving, at the third switch port, a second packet from the PHY of the second controller board, transmit the second packet to the second switch port in order to transmit the second packet to the first Ethernet port.

6. The apparatus of claim 1, wherein the controller board further comprises:
first printed circuit board (PCB) wirings configured to couple the first MAC to the Ethernet switch; and
second printed circuit board (PCB) wirings configured to couple the second MAC to the third PHY.

7. The apparatus of claim 1, wherein the Ethernet switch comprises a three port managed Ethernet switch configurable to implement either a PHY mode or a MAC mode.

8. The apparatus of claim 2, wherein the connector comprises a board-to-board connector.

9. The apparatus of claim 1, wherein the computer processing circuitry further comprises a fourth MAC configured to communicate to a second apparatus.

10. A carrier board comprising:
a first connector configured to physically and communicably couple the carrier board to a first controller board;
a second connector configured to physically and communicably couple the carrier board to a second controller board;
first and second Ethernet ports coupled to the first and the second connectors, respectively;
a first wiring configured to couple a first set of terminals of the first connector to the first Ethernet port;
a second wiring configured to couple a second set of terminals of the second connector to the second Ethernet port; and a third wiring configured to couple the first connector to the second connector,
wherein the carrier board is configured to:
in response to receiving an uplink packet at the first set of terminals, carry the uplink packet to the first Ethernet port for transmission to an external Ethernet node;
in response to receiving an uplink packet at the second set of terminals, carry the uplink packet to the second Ethernet port for transmission to the external Ethernet node; and
in response to receiving an uplink packet from the second controller board through the third wiring, transmit the uplink packet to a non-exposed PHY port of an Ethernet switch of the first controller board, and subsequently transmit the uplink packet from an exposed PHY port of the Ethernet switch to the first Ethernet port.

11. The carrier board of claim 10, wherein each connector is configured to physically and communicably couple to one controller board.

12. The carrier board of claim 10, further comprising a fourth wiring configured to couple the first connector to the second connector,
wherein the carrier board is configured to, in response to receiving an uplink packet from the first controller board through the fourth wiring, transmit the uplink packet to a non-exposed PHY port of an Ethernet switch of the second controller board, and subsequently transmit the uplink packet from an exposed PHY port of the Ethernet switch of the second controller board to the second Ethernet port.

13. A system comprising:
at least one remote terminal unit (RTU) controller module, each RTU controller module comprising:
a controller board configured to couple to a carrier board that includes first and second Ethernet ports;
computer processing circuitry including first and second media access controls (MAC) and configured to select to transmit a packet to the first Ethernet port through the first MAC and to alternatively select to transmit the packet to the second Ethernet port through the second MAC;
an Ethernet switch configured to receive the packet from the first MAC and transmit the packet to the first Ethernet port, the Ethernet switch comprising:
a first switch port that includes a third MAC coupled to the first MAC;
a second switch port that includes an exposed physical Ethernet interface (PHY) configured to couple the Ethernet switch to the first Ethernet port; and
a third switch port that includes a non-exposed PHY configured to couple the first Ethernet port to a PHY of another controller board; and
a third PHY configured to receive the packet from the second MAC and transmit the packet to the second Ethernet port,
wherein the computer processing circuitry, the Ethernet switch, and the third PHY are mounted on the controller board.

14. The system of claim 13, further comprising the carrier board, wherein the carrier board comprises:
at least one connector configured to physically and communicably couple the carrier board to at least one controller board of the RTU controller module;
first and second Ethernet ports coupled to the at least one connector;

a first wiring configured to couple the at least one connector to the first Ethernet port; and a second wiring configured to couple the at least one connector to the second Ethernet port, wherein the carrier board is configured to:
   in response to receiving the packet from the controller board through the first wiring, carry the packet to the first Ethernet port; and
   in response to receiving the packet from the controller board through the second wiring, carry the packet to the second Ethernet port.

15. The system of claim 14, wherein each connector is configured to physically and communicably couple to one controller board.

16. The system of claim 14, wherein:
the carrier board comprises a non-redundant carrier board;
the at least one connector comprises a single connector;
the first wiring is configured to couple the single connector to the first Ethernet port; and
the second wiring is configured to couple the single connector to the second Ethernet port.

17. The system of claim 14, wherein:
the exposed PHY is configured to couple the Ethernet switch to the first Ethernet port through the connector; and
the non-exposed PHY is configured to couple the third PHY to the second Ethernet port through the connector.

18. The system of claim 17, wherein:
the carrier board comprises a redundant carrier board;
the at least one remote terminal unit (RTU) controller module comprises a first RTU controller module that includes a first controller board and a second RTU controller module that includes a second controller board;
the at least one connector comprises a first connector configured to couple the carrier board to the first controller board and a second connector configured to couple the carrier board to the second controller board;
the first wiring is configured to couple the first connector to the first Ethernet port; and
the second wiring is configured to couple the second connector to the second Ethernet port.

19. The system of claim 18, further comprising:
a third wiring configured to couple the first connector to the second connector, thereby coupling the third switch port of the first controller board to a PHY port of the second controller board; and
a fourth wiring configured to couple the first connector to the second connector, thereby coupling a PHY port of the first controller board to the third switch port of the second controller board, wherein the carrier board is configured to, in response to receiving an uplink packet from the second controller board through the third wiring, transmit the uplink packet to a non-exposed PHY port of an Ethernet switch of the first controller board, and subsequently transmit the uplink packet from an exposed PHY port of the Ethernet switch to the first Ethernet port, wherein the carrier board is configured to, in response to receiving an uplink packet from the first controller board through the fourth wiring, transmit the uplink packet to a non-exposed PHY port of an Ethernet switch of the second controller board, and subsequently transmit the uplink packet from an exposed PHY port of the Ethernet switch to the second Ethernet port.

20. The system of claim 14, wherein the at least one connector comprises a board-to-board connector.

* * * * *